(12) United States Patent
Laakso et al.

(10) Patent No.: US 8,423,537 B2
(45) Date of Patent: Apr. 16, 2013

(54) METHOD AND ARRANGEMENT FOR HANDLING OF INFORMATION SEARCH RESULTS

(75) Inventors: Terho Laakso, Espoo (FI); Pasi Nummisalo, Vantaa (FI); Mika Könnölä, Espoo (FI); Rami Hänninen, Espoo (FI)

(73) Assignee: Documill Oy, Espoo (FI)

( * ) Notice: Subject to any disclaimer, the term of this patent is extended or adjusted under 35 U.S.C. 154(b) by 462 days.

(21) Appl. No.: 12/219,192

(22) Filed: Jul. 17, 2008

(65) Prior Publication Data

US 2009/0150353 A1 Jun. 11, 2009

(51) Int. Cl.
*G06F 17/30* (2006.01)
(52) U.S. Cl.
USPC .......................................... 707/722; 715/760
(58) Field of Classification Search .................. 707/705, 707/722–738, 758–763; 715/760
See application file for complete search history.

(56) References Cited

U.S. PATENT DOCUMENTS

| | | | |
|---|---|---|---|
| 6,356,908 B1* | 3/2002 | Brown et al. ........................ | 1/1 |
| 6,721,729 B2* | 4/2004 | Nguyen et al. ........................ | 1/1 |
| 6,819,339 B1 | 11/2004 | Dowling | |
| 7,065,520 B2* | 6/2006 | Langford ...................... | 707/769 |
| 7,203,900 B2* | 4/2007 | Nara et al. .................... | 715/255 |
| 7,546,538 B2* | 6/2009 | Shuping et al. ............... | 715/760 |
| 7,574,649 B1* | 8/2009 | Safars et al. .................. | 715/200 |
| 7,707,198 B2* | 4/2010 | Weber et al. .................. | 707/705 |
| 8,024,658 B1* | 9/2011 | Fagans et al. ................. | 715/730 |
| 8,161,411 B2* | 4/2012 | Robbin et al. ................ | 715/854 |
| 2002/0073058 A1* | 6/2002 | Kremer et al. .................... | 707/1 |
| 2002/0143523 A1* | 10/2002 | Balaji et al. ........................ | 704/8 |
| 2004/0267700 A1 | 12/2004 | Dumais et al. | |
| 2006/0101330 A1* | 5/2006 | Godley ......................... | 715/513 |
| 2006/0111971 A1* | 5/2006 | Salesin et al. ................... | 705/14 |
| 2006/0277167 A1* | 12/2006 | Gross et al. ....................... | 707/3 |
| 2007/0073833 A1 | 3/2007 | Roy et al. | |
| 2007/0074125 A1* | 3/2007 | Platt et al. ..................... | 715/760 |

FOREIGN PATENT DOCUMENTS

| | | |
|---|---|---|
| EP | 1306745 A1 | 5/2003 |
| WO | WO01/57643 A1 | 2/2001 |

OTHER PUBLICATIONS vBulletinMods; How Design Affects Performance: Progressive Rendering; Princeton, VBulletin.org Forum, Oct. 18, 2007, 10 pages.
Adobe Reader 7.0 Available for Download; Kurt Foss; Planet.pdf.com; Dec. 21, 2004; 5 pages.
Microsoft Office 2003—Wikipedia, the free encyclopedia; 4 pages.
ActiveX Controls on the Internet; MSDN; Microsoft Corporation, 2008, 7 pages.

* cited by examiner

*Primary Examiner* — Wilson Lee
(74) *Attorney, Agent, or Firm* — Birch, Stewart, Kolasch & Birch, LLP

(57) ABSTRACT

The invention relates to a method and an arrangement for handling of information search results. The method includes at least: entering a search query; sending the query to a search engine; and receiving a search result having a list of data files matching to the search query. And the method comprises at least: paginating the content of the data files retrieved; rendering page previews of the data files; selecting the pages to be previewed; and previewing the matching pages associated with the data files retrieved.

25 Claims, 9 Drawing Sheets

METHOD AND ARRANGEMENT FOR HANDLING OF INFORMATION SEARCH RESULTS

FIELD OF THE INVENTION

This invention relates to the field of information search and data file content filtering. In particular, the present invention relates to a method and an arrangement to preview search results obtained from search engine in response to a user query that can be generated automatically or manually.

BACKGROUND OF THE INVENTION

The continued growth and popularity of the Internet and company Intranets and Extranets as sources of information has resulted to information explosion to users. This has lead to a demand from users for find ways to easily search and verify the relevancy of the particular information they are looking for. Typically, when a user is looking for information from Internet on a particular subject he or she will use public search engines such as Google or Microsoft Live. In case of company Intranet or Extranet search, the user often uses company's internal search engine. The term user in this context can mean a human user who makes manual searches or a machine-based user that can be for instance a process that makes automatic searches after an alarm has occurred in an industrial process.

Generally speaking a search engine is a program that performs a search based on user search query (e.g. keyword(s) or phrase) and sends the results back to the user. These results typically include a listing of hyperlinks for the web pages or other documents produced by the search and additional information such as an excerpt of the text on the page, which relates to the keywords entered by the user for the search and the file type of the result document. Techniques, such as Boolean query language, may be used to create a search phrase and limit and narrow down the number of search hits.

After the initial keyword based relevancy matching done by the search engine the user must determine the relevancy and importance of the result document by reviewing the text excerpt from document presented in the result page of the search. In FIG. 1 there is a typical prior art search user interface including a search query area and a search results listing area with document titles, the file type descriptions and text excerpts. The larger the result set, the longer it takes the user to review the document titles and text excerpts of the search results.

In most of the cases to really ensure whether a document is an ideal match to the search query the user still has to view the original document. By clicking on a hyperlink (URL) and accessing the document resource with a web browser, the document content must be downloaded from the server to the client. If the document type is not supported by the web browser, an external viewer has to be launched to access the document. As a result of this process considerable amount of time is spent because the user typically has to download and review several documents before there is a good match for the original search query.

In some cases the search listing contains visual presentations (also known as thumbnails) of the web pages, still images and first/multiple frames of the video content. In case of Web (HTML) document thumbnails, the HTML pages are rendered into bitmap graphics and resized in order to create visual abstracts of the pages. It is well known to those skilled in the art that rendering means processing a document for visual representation. The rendering engine of the web browser essentially processes format instructions and converts them into graphical elements, determines the layout and calculates the overall appearance of the document. The thumbnail presentation may work fine for the web documents if the content length is sufficiently small, fitting into standard screen size and resolution. This content is then scaled according to thumbnail dimensions, providing a very high-level preview of the web page.

However, a single thumbnail presentation is not practical for documents containing multiple pages i.e. paginated content such as Microsoft Word, Microsoft PowerPoint or PDF documents. To ensure visual accuracy and re-production of original layout characteristics, the rendering and the original document should follow the document specific pagination as closely as possible. The process should produce previews from the original document following the pagination logic, creating at least one new representation for each page or slide of the document.

Besides identifying the document which matches the search query, it would also be helpful for the user to instantly see document pages that match the search query at the first glance in order to quickly determine whether the document is relevant for further investigation.

SUMMARY OF THE INVENTION

In view of the foregoing and other problems of the conventional information search methods, it is, therefore, an object of the present invention to provide a method and arrangement for handling of information search results in a way that helps to reduce time spent on reviewing and verifying relevancy of search results.

According to one aspect of the present invention there is a client server computing platform including; (a) means for examination of the data file name returned by a search engine (b), means for identification of the source (URL) from which the data files are available (c), means for obtaining the data files from the source (d) and means for generating one or more visual presentations for desired data file pages.

According to another aspect of the present invention the standard capabilities of a web browser may not support direct access to the data files. The data file access may require the $3^{rd}$ party manufactured external plug-ins or viewers e.g. PDF viewer, Microsoft PowerPoint Viewer or Microsoft Word Viewer. The present invention provides means for accessing and previewing data file pages with the standard capabilities of a web browser.

According to further features of the invention the data files described in the previous paragraphs contain one or more pages. The invention has means for generating visual presentations of data file pages that may differ in visual dimensions (pixels) but the representations will always follow the pagination logic of the data file or the pagination calculated as part of the content rendering process based on the data file content. A page preview is a result of the data file pagination and the data file content rendering. The rendering process creates individual page preview files of the data file content according to the pagination.

The page previews of a data file may be presented as m by n matrix area below the individual search result provided by the search engine. A larger and readable page presentation may be displayed on the output device when the cursor is moved or clicked on top of the small page preview. The larger page may also be closed when the cursor is clicked or moved away from the large page preview displayed on the output device.

According to the further aspect of the innovation, the m by n matrix of the page previews contains those pages that match to the search keyword(s) or phrase. In addition the keyword(s) or phrase(s) are highlighted at the page level preview presentations.

Other objects, advantages and important features of the present invention will become apparent from the following detailed description taken in conjunction with the annexed drawings, which disclose but do not limit preferred embodiments of the invention.

BRIEF DESCRIPTION OF THE DRAWINGS

The accompanying drawings, which are incorporated in illustrate an embodiment of the present invention. It should be understood, however, that the invention is not limited to precise arrangements and depictions shown in the drawings.

FIG. 2A illustrates main modules of the preview engine;

DESCRIPTION OF THE INVENTION

The following detailed description of the invention refers to the accompanying drawings. The same reference numbers in different drawings identifies the same or similar elements. Also, the following detailed description does not limit the invention.

The present invention aims to improve and quicken the user's ability to discover relevant information from large data files containing several pages. This may be accomplished by creating and possibly caching visual presentations of data file pages for quick content preview. In that respect the invention is a tool that makes the handling of information and particularly the handling of search results easier and faster compared to conventional solutions.

The arrangement according to the present invention enhances information discovery by displaying differently sized visual presentations of individual data file pages. This provides the user with ability to quickly review and verify the relevancy of the data file content as well as view readable previews of the selected matching pages inside the data file. The user can verify the relevancy of several data files content concurrently because the arrangement provides simultaneously previews from several data files to the output device. The server may use a caching mechanism to store the visual presentations of the data files into a cache so that users who later access the same document do not require system to regenerate the visual presentations. The cache may be programmed to store the visual presentations for a specific amount of time and then delete the presentations to conserve storage space. The cache may also be programmed to optimize the visual presentation file size in means of bitmap graphics optimization and a graphics format compression to conserve storage space.

Figure 1:
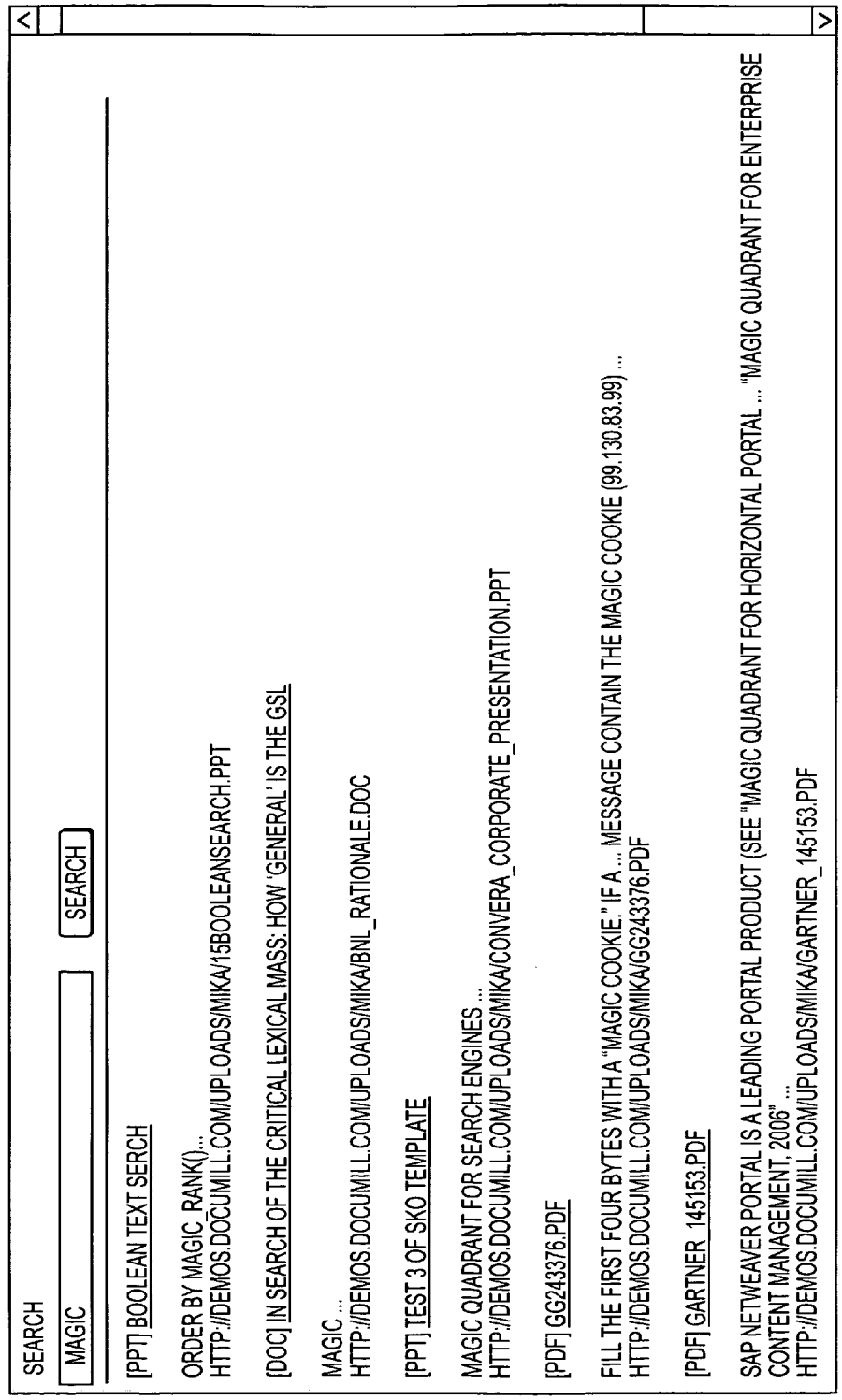
FIG. 1 illustrates a prior art search results listing.
Figure 2:
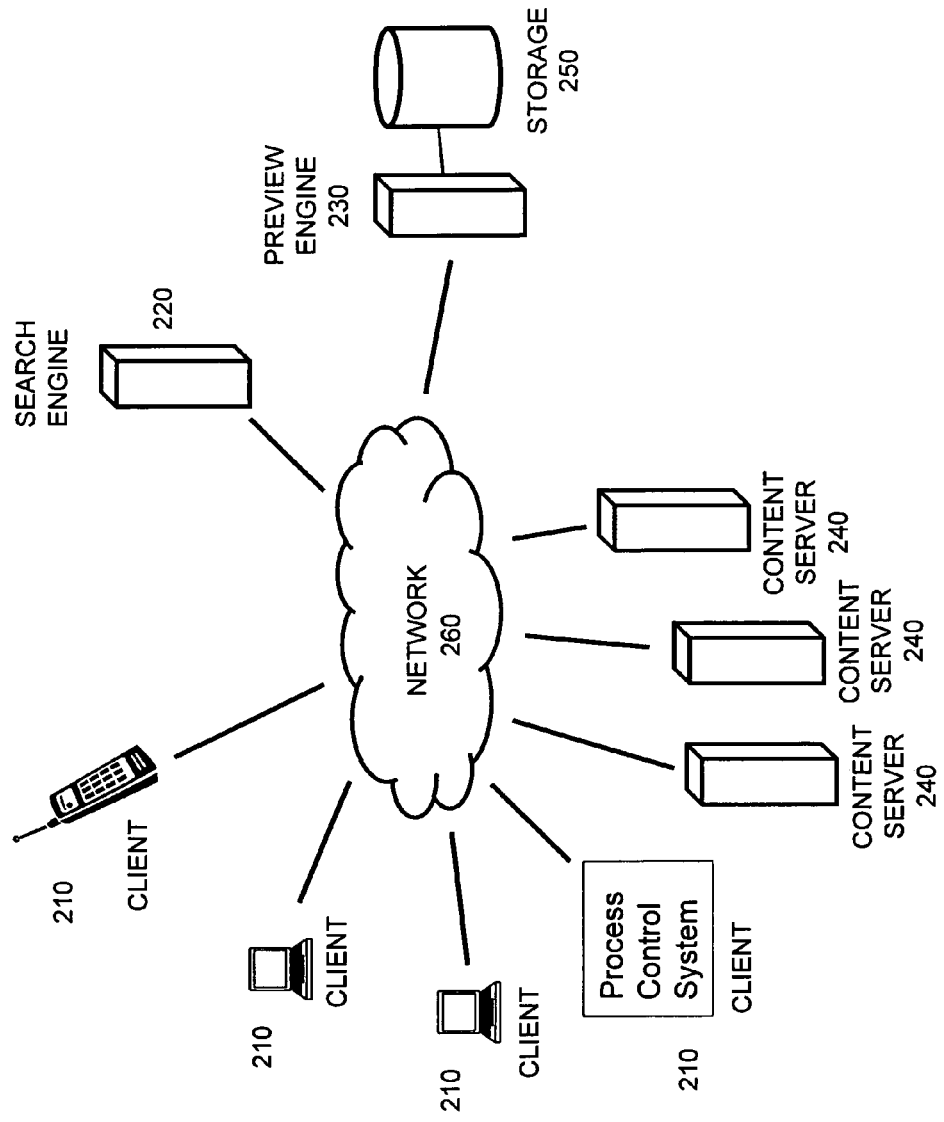
FIG. 2 is an exemplary diagram of a network based search system in which systems and methods consistent with the principles of the invention may be implemented.
Figure 2:
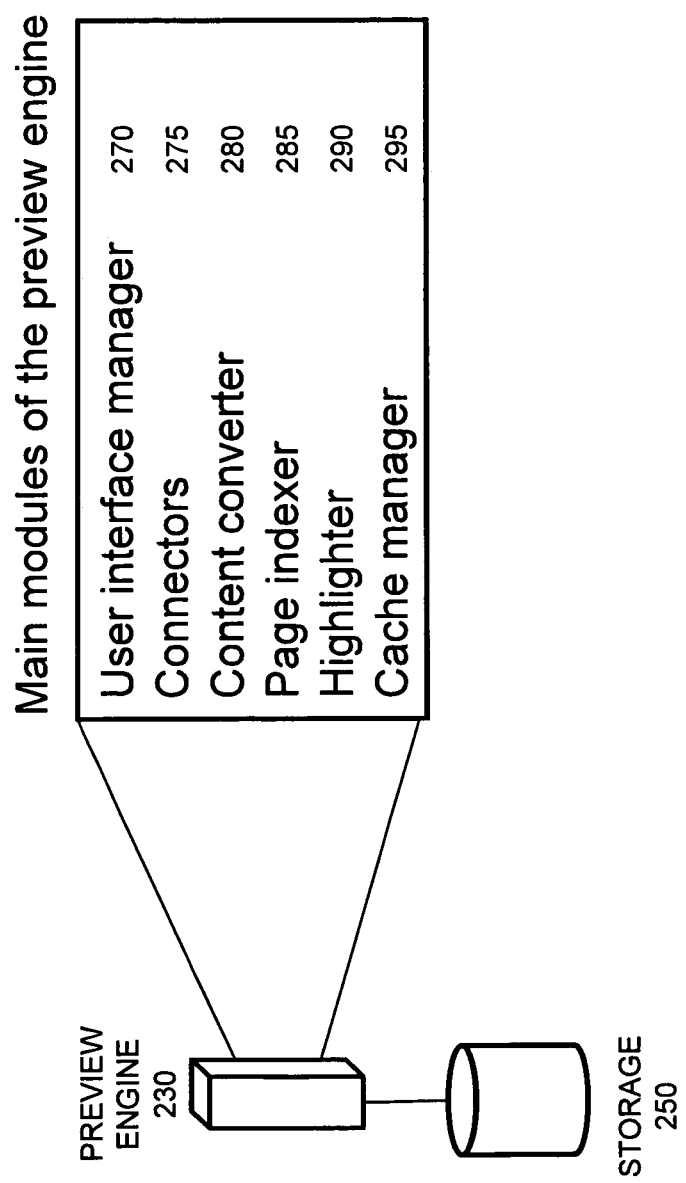

FIG. 2 is an exemplary diagram of a network in which arrangements and methods consistent with the principles of the invention may be implemented. Network may include multiple clients 210 connected to multiple servers 220-240 via a network 260. As an example, three clients 210 and five servers 220-240 have been illustrated as connected to a network 260. In practice, there may be more or fewer clients and servers.

The client may be defined as a device, such as a wireless telephone, a personal computer, a personal digital assistant (PDA), a laptop, or another type of computation or communication device or process running on one of these devices, and/or an object executable by one of these devices, or a process or a function running in an industrial process. Servers 220-240 may include server and storage entities that gather, process, search, and/or cache data files in a manner that is consistent with the principles of the invention.

In an implementation consistent with the principles of the invention, server 220 represents a search engine usable by the clients 210 via the server 230 that acts as a preview engine. Server 220 may find and identify data files and web documents located in the content servers 240, index the data files and web documents, and store information associated with the data files and web documents in a data repository. Server 220 may use other servers or alternative data repositories to store information associated to the data files or web documents that it may have crawled or analyzed from the content servers 240.

Server 230 runs the preview engine to generate and cache previews of the data file pages into the content storage 250 according to the principles of the invention. The content storage 250 may be part of the preview engine or it could be a separate server entity depending on the infrastructure requirements and deployment.

While servers 220-240 are shown as separate entities, it may be possible for one or more of servers 220-240 to perform one or more of the functions of another one or more of servers 220-240. It may be possible that several servers are clustered to run the search engine, and/or preview engine and/or content server as a single entity. It may also be possible that parts of the search engine, and/or preview engine and/or content server tasks are distributed to several servers.

Network 260 may include a local area network (LAN), a wireless local area network (WLAN) a wide area network (WAN), a wireless communication network, such as Global System for Mobile communications (GSM), an Intranet, the Internet, or a combination of networks. Clients 210 and servers 220-240 may connect to network 260 via wired, wireless, and/or optical connections.

FIG. 2A describes main modules of the preview engine 230. In an implementation consistent with methods and arrangements of the innovation the preview engine 230 may include at least the following modules: a user interface manager 270, connectors 275, a content converter 280, a page indexer 285, a highlighter 290 and a cache manager 295.

The interface manager 270 is equipped with means to interact with the user through the client 210, to receive a search query and to provide search results with the data file page previews. The connectors 275 are a set of application program interfaces to connect the preview engine 230 to the other servers 220 and 240. The connectors 275 have means for sending a user search query to the search engine 220, receiving a search result list from the search engine 220 and downloading the data files from the content servers 240 to the preview engine 230.

The content converter 280 has paginating means for paginating data files content and rendering page previews from the data files. The page indexer 285 has means for indexing the data file pages for filtering purposes, and means for searching and selecting the matching pages from the data files. The highlighter module 290 is arranged to highlight the search query text in the preview pages. The cache manager 295 has means for storing and retrieving data files page previews into the storage 250 and crawling the data files page previews in the storage 250 according to the specified rules.

Figure 3:
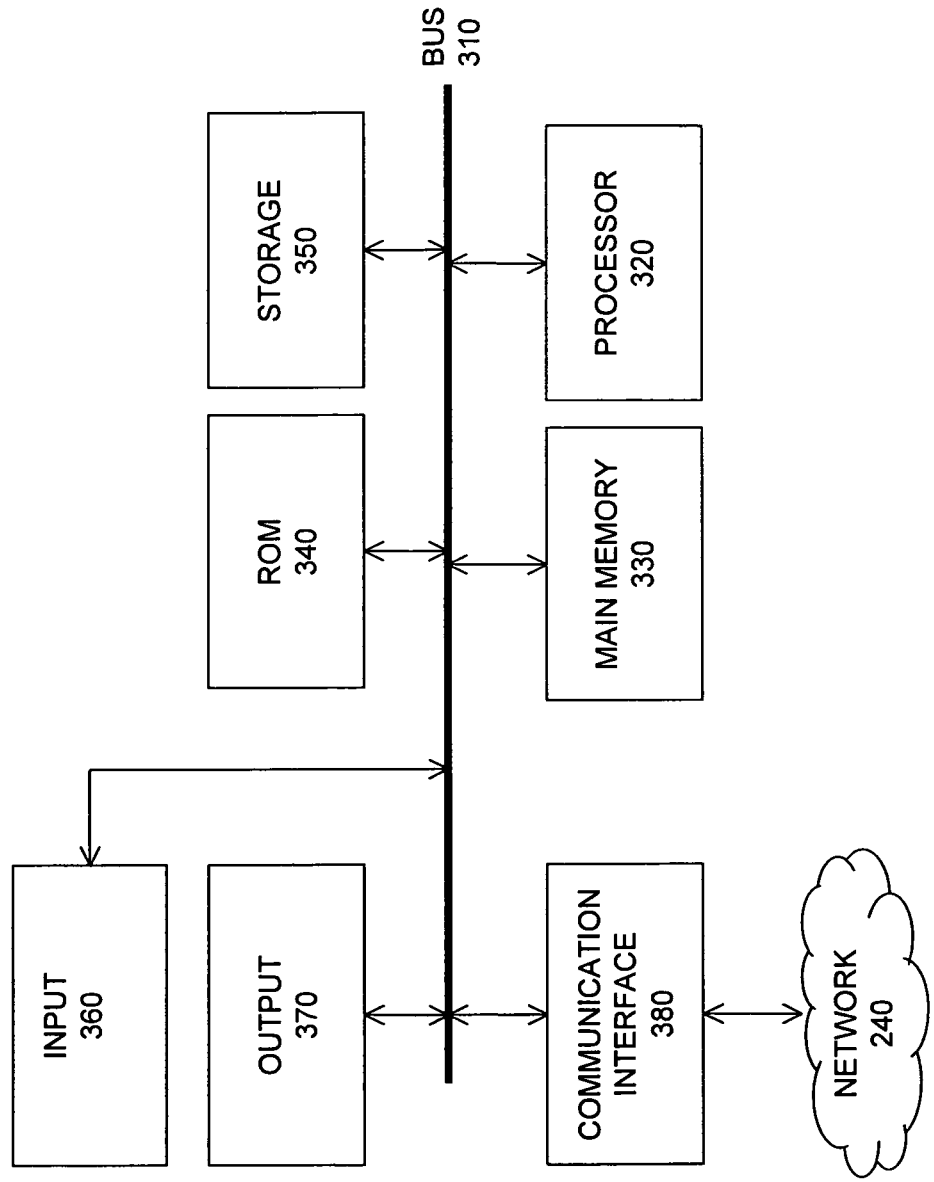
FIG. 3 is an exemplary diagram of a client or server of FIG. 2 according to an implementation consistent with the principles of the invention.

FIG. 3 is an exemplary diagram of a client or server entity (hereinafter called "the client/server entity"), which may correspond to one or more of clients 210 and servers 220-240, according to an implementation consistent with the principles of the invention. The client/server entity may include a bus 310, a processor 320, a main memory 330, a read only memory (ROM) 340, storage medium 350, input means 360, output means 370, and a communication interface 380 to the network 260. The bus 310 may include means or methods that permit communication among the elements of the client/server entity.

The processor 320 may include a conventional processor, microprocessor, or processing logic that interprets and executes instructions. The main memory 330 may include a random access memory (RAM) or another type of dynamic storage device that may store information and instructions for execution by the processor 320. The ROM 340 may include a conventional ROM device or another type of a static storage device that may store static information and instructions for use by the processor 320. The storage medium 350 may be a magnetic, electronic or optical medium, including needed drivers and devices.

The input means 360 may include a conventional mechanism that permits a user to input information to the client/server entity, such as a keyboard, a mouse, a pen, a touch screen, voice recognition and/or biometric mechanisms, etc. The output device 370 may include a conventional mechanism that outputs information to the user, including a display, a printer, a speaker, etc. The communication interface 380 enables the client/server entity to communicate with other devices and/or systems over the network 260. For example, the communication interface 380 may include mechanisms for communicating with another device or system via a network 260.

As it will be described in detail below, the client/server entity described in FIG. 2, consistent with the principles of the invention, has equipped with means to perform certain search-related operations. The client/server entity may perform these operations in response to the processor 320 executing software instructions contained in the computer-readable medium, such as memory 330. A computer-readable medium may be defined as a physical or logical memory device.

The software instructions may be read into the memory 330 from another computer-readable medium, such as a data storage device 350, or from another device via the communication interface 380. The software instructions contained in the memory 330 may cause the processor 320 to perform processes that will be described later. Alternatively, a hardwired circuitry may be used in place of or in combination with software instructions to implement processes consistent with the principles of the invention. Thus, implementations consistent with the principles of the invention are not limited to any specific combination of hardware circuitry and software.

Figure 4:
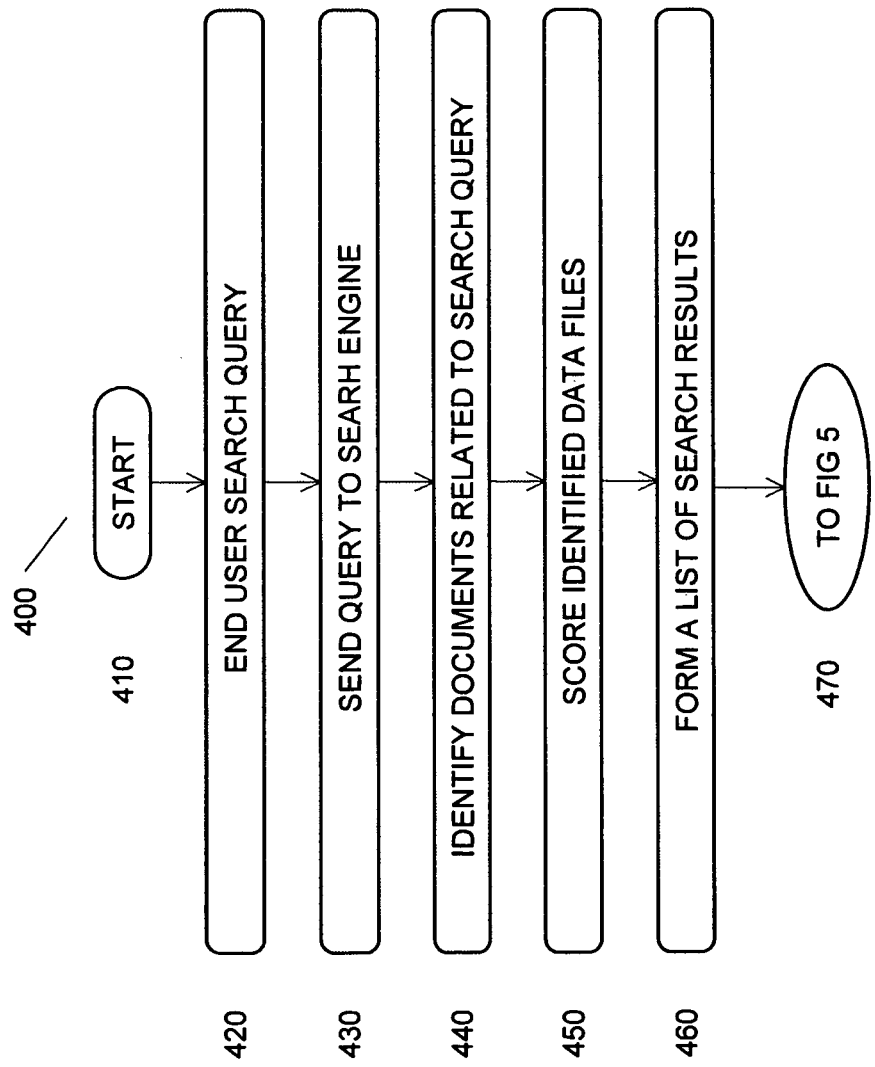
FIG. 4 is a flowchart of exemplary search query and search result from search engine according to an implementation consistent with the principles of the invention.

FIG. 4 describes an exemplary procedure 400 of a search query 420 related to the data files preview according to an implementation consistent with the principles of the invention. The procedure may begin with a user providing a search keyword (s) or phrase and selecting data file type(s) (e.g. pdf, doc, ppt, xsl) as a search query 420. The preview engine 230 receives the search query 430 and sends the search query 430 over the network 260 to the search engine 220. The search engine 220 may be a publicly available service such as Google or Microsoft Live or alternatively the search engine 220 may locate inside company network accessing internal data repositories or the search engine 220 could be embedded functionality of an application.

The search query 420 is received by the search engine 220 from the preview engine 230. The search engine 220 is used to identify files (e.g. white papers, presentations, research papers, etc.) related to the search query 420. A number of techniques exist for identifying data files related to a search query 440. The techniques are known to those skilled in the art.

The data files identified by the search engine 220 are scored in some known manner in the step 450 of the procedure 400. The score for a data file may be based on an information retrieval (IR) score or a similar relevancy ranking value. Several techniques exist for generating an IR score. For example, one simple method for an IR score for a data file may be generated based on the number of occurrences of the search terms inside data files. Other techniques are known to those skilled in the art.

A list of search results 460 is formed by the search engine 220 based on the identified data files 440 and their scoring 450. In one implementation, the search results list 460 may include information associated with the data files, such as URL of the data file and the data file type and textual abstract of the data file. The search results list 460 may be provided as an HTML document, similar to the search results provided by the conventional search engines 220. Alternatively, the search results list 460 may be provided according to another format agreed upon by the search engine 220 and the preview engine 230, e.g. Extensible Markup Language (XML).

The list of search results 460 formed by the search engine 220 will be provided to the preview engine 230 for further processing.

Figure 5:
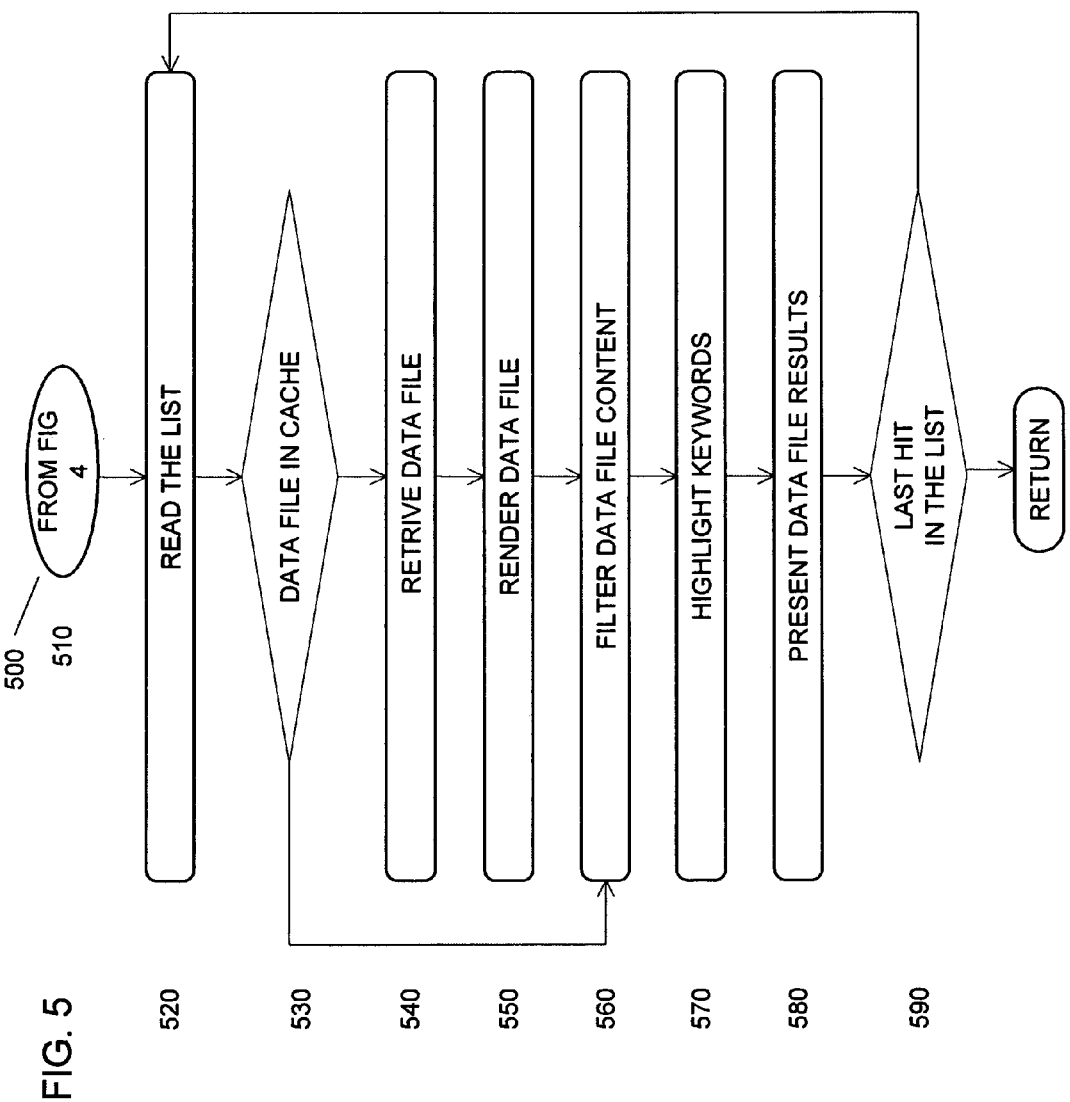
FIG. 5 is a flowchart of exemplary search result preview generation to a search query according to an implementation consistent with the principles of the invention.

FIG. 5 describes an exemplary procedure 500 of the data file preview creation with keyword(s) highlighting. The preview engine 230 has means for running the procedure 500 on the preview engine 230. The list of search results 460 that may be listed according to the scoring 450 is received from the search engine 220 to the preview engine 230. The search result may include search hits range from 1 to as many as the search engine 220 finds from the index. For the sake of preparing convenient output for the end user the entire search result list 460 is divided in K pages containing N hits according to resource constraints. The number of N may be 10 in one embodiment. The step 520 in the procedure 500 running in the preview engine 230 is arranged to read the first hit from the search result list 460 and to look up if the corresponding data file previews already exists in the storage 250, and if it does, the procedure 500 is fitted to proceed directly to the data file filtering phase 560. In case the data file is not cached in the storage 250 the preview engine 230 downloads the data file from the content server 240 according to the URL associated to the data file. When the preview engine 230 has retrieved the data file the content converter module 280 paginates and renders the data file page previews 550. The content converter 280 paginates the data file as accurately as possible according to the original appearance of the data file. In one embodiment the original appearance means the visual layout the data file may have when it is opened with the program it was originally produced, e.g. the Microsoft Word document opened with the Microsoft Word program.

The visual layout information coupled with the pagination data is used to create one or more versions of preview pages from the data file. In one embodiment, one version may be a small size preview page and other version a larger, more readable preview of the page. Yet in another embodiment, the size and visual dimensions of different versions of the preview pages can be fixed sizes specified by the user, the output display device or the system, or can be based on the size of the window used to view the data file preview pages.

In one embodiment, the content converter 280 has separating means to separate text and graphical information from the data file pages. The text information may be stored as a HTML content file and graphical information may be stored as a background image file. In one embodiment there may be several background image files and one HTML text content file for a data file page. A preview page may be a combination of a layered HTML text and background image. One result of the data file rendering 550 may be several print sizes of the preview presentations from the data file pages.

Yet in another embodiment, the content converter 280 has means to transcode the data file pages into vector formats such as but not limited to PDF or SVG. The result of the data file rendering 550 may be vector files of preview pages.

The original downloaded data file and the preview files may be cached and stored into the storage 250 by the cache manager 295 once the data file rendering is completed for further usage to reduce the preview processing time in case the same data file is requested by another search query.

The data file filtering stage 560 is executed by the page indexer module 285 that has means for indexing, searching and selecting those HTML text files and associated image files that match the search query keyword(s) or search phrase provided by the user. In one embodiment the page indexer 285 generates an index of the data file pages. This index is used for searching and selecting the matching pages from the data file. The index of data file pages may also be cached into the storage 250 for further retrieval and usage.

In another embodiment the background of the word(s) matching to the user search query 420 are colored differently from the rest of the text in the filtered data file pages. Yet in another embodiment, the highlighting of keyword(s) 570 may be a part of the HTML text presentations of the data file page that matches to the user search query 420.

The user interface manager 270 has displaying means for displaying the preview(s) of the data file page(s) that contains user search query keyword(s) or phrase to the end user. One data file may contain several page hits. In one embodiment, the matching pages may be grouped together based on a relevancy order or some alternative criteria, and displayed as page level search results. In such embodiment this procedure may be repeated since N data file hits provided by the search engine 220 will be processed by the user interface manager 270 for an output device in the client 210 to preview concurrently multiple data file content. The procedure 500 may be repeated on a user request to display search results on any page between 1 and K. The user may also provide a new search keyword (s) or phrase when the control is returned back to the procedure 400.

Figure 6A:
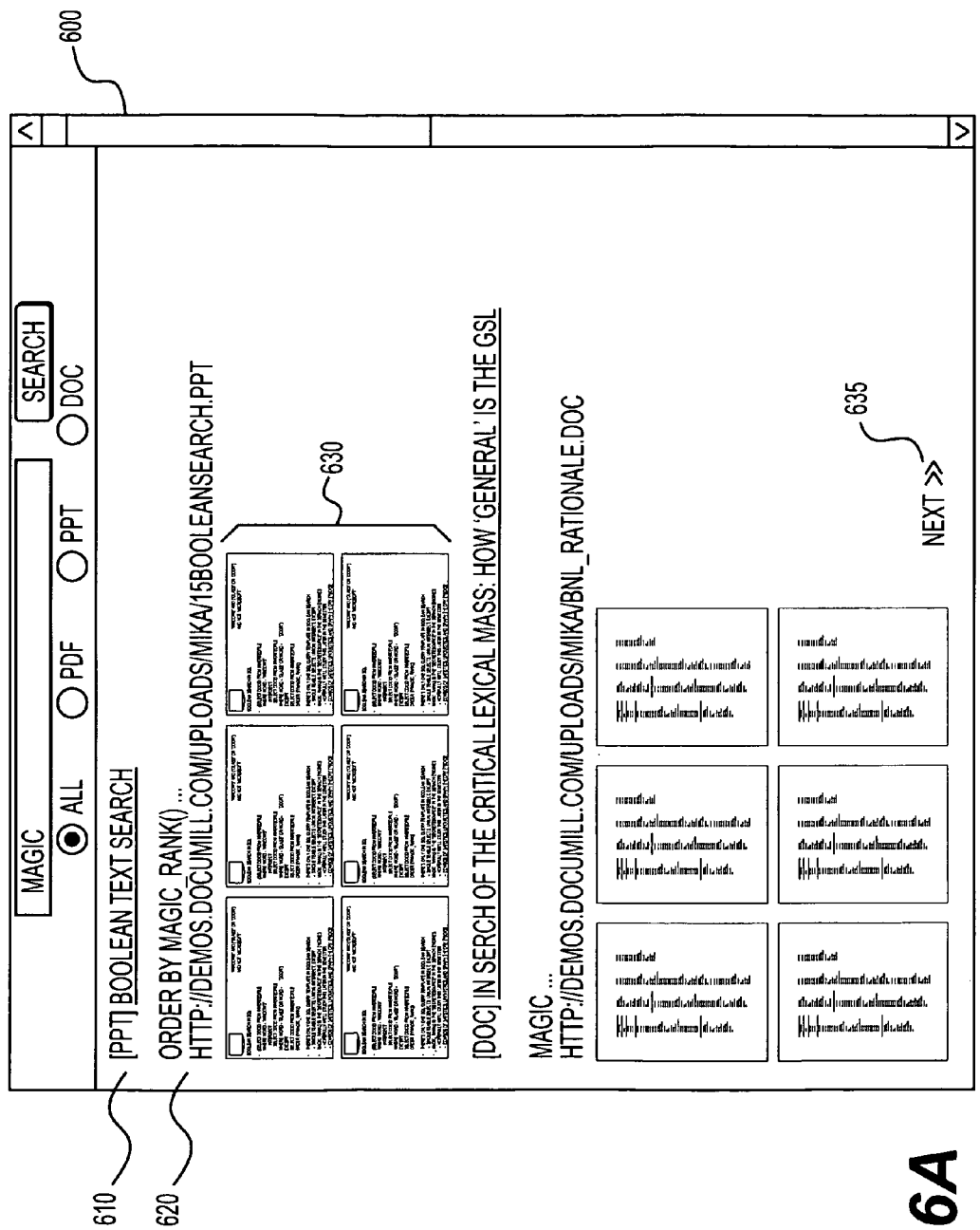
FIGS. 6A-6C are exemplary diagrams of user interface for presenting concurrent page previews of data files as a part of search results according to implementations consistent with the principles of the invention.
Figure 6B:
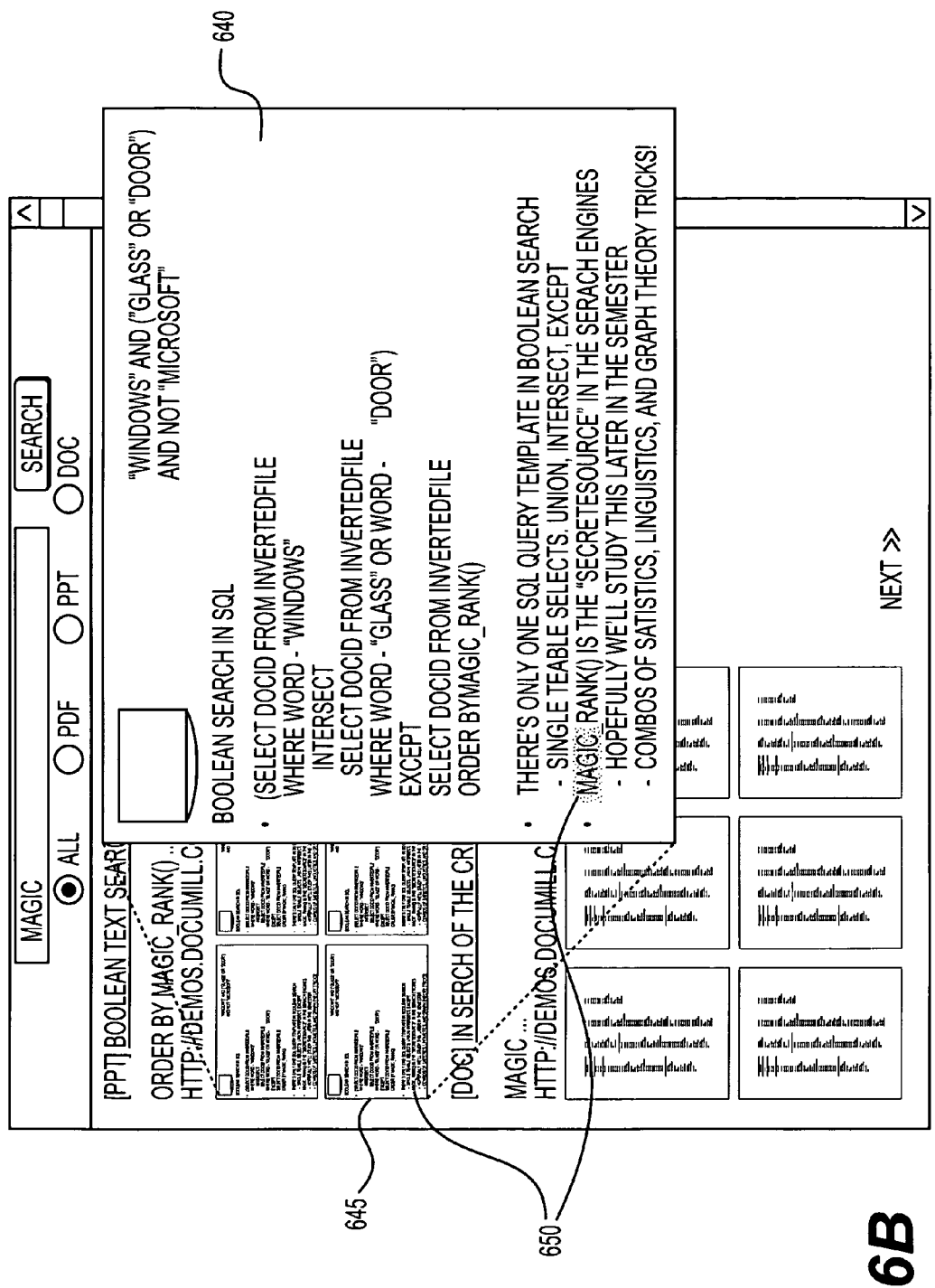
Figure 6C:
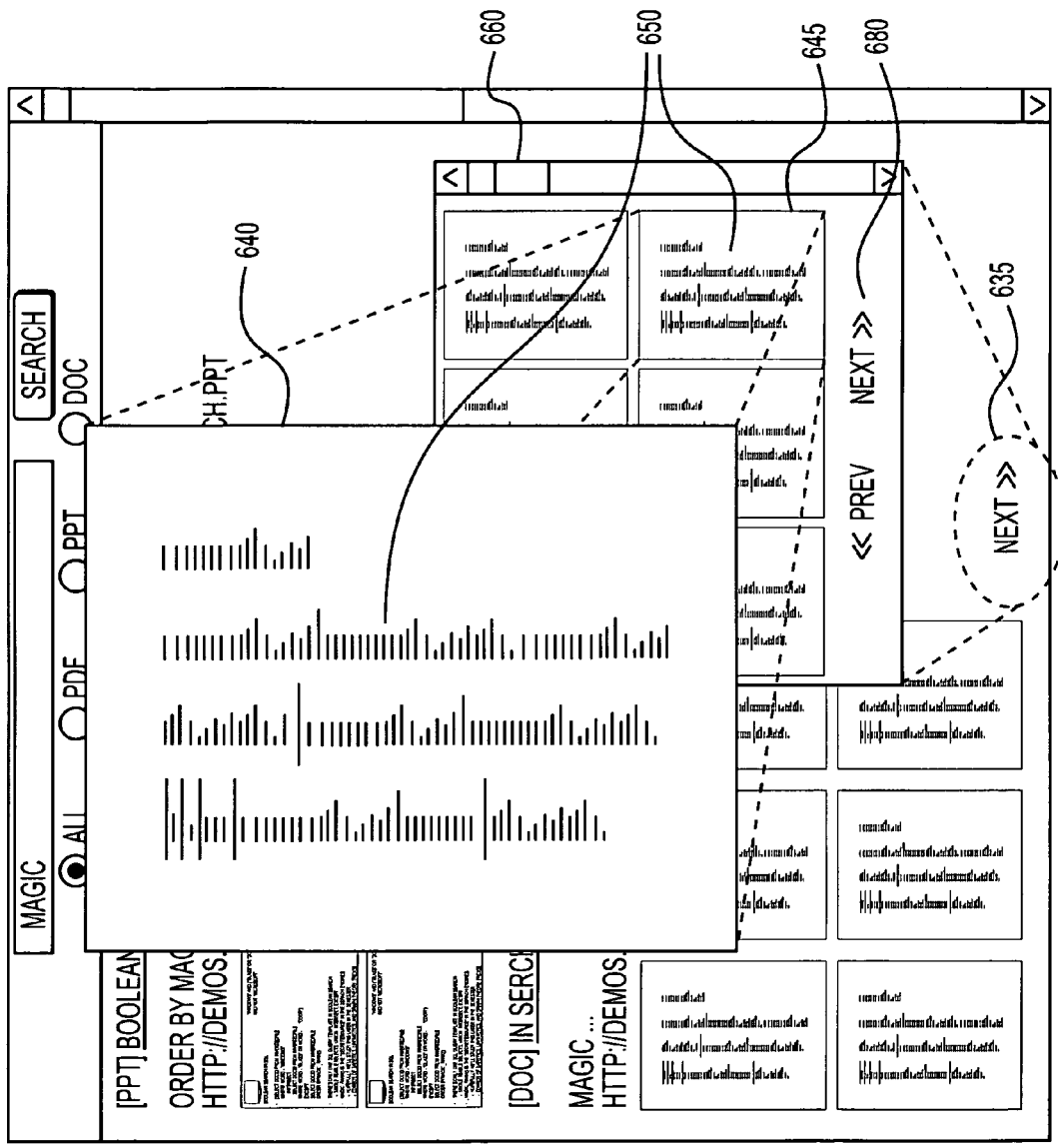

FIGS. 6A-6C are exemplary diagrams of data file preview output implementations in a browser consistent with the principles of the invention. The user interface manager module 270 controls output for the user in the client 210. In one implementation, as shown in FIG. 6A a data file preview output 600 may include the data file type and name as a hyperlink to download the data file 610 and a textual abstract of the data and its URL 620. This data file information may be provided by the search engine 220 or other system, as a part of the search result data. The data file preview may include a set of pages associated with the data file search results 630. The data file pages that match to the user search query are laid out in a preview section in the m by n matrix 630. The matrix 630 and the size of the preview pages may be a fixed size specified by the user or the system, or can be based on the size of the window used to view the data file pages. In one embodiment the m by n may be 3 by 2. Yet in another embodiment, the preview pages may contain highlighting of the keyword(s) or phrase used by the user in the search query. In case the data file contains more than preset m by n page hits, (e.g. the system or the user has defined the present matrix size to six but there are fifteen pages for the preview), for user search query there may be a link for other set of page previews 635.

In another implementation of the data file page preview, as shown in FIG. 6B, a page may include link to a larger preview page 640 of the small preview page. The selected small preview page 645 that is zoomed in for better readability may have matching search keyword(s) highlighted. The bigger preview page 640 may be opened when the cursor or client pointer moves on the top of the small size preview page 645 or the small size page 645 is clicked with the client pointer or cursor action. The large preview page 640 may be closed by a pointer click or moving the client pointer outside the large page area. In one embodiment, both the small and the large preview pages may have similar text highlighting method 650 of the search key word(s) or phrase. The preview engine has also means to display meta data of the data file such as but not limited to data file properties or slide notes information.

In yet another implementation, as shown in FIG. 6C, the data file may contain more than preset m by n page hits. The small page preview matrix section 630 of data file may include link 635. By clicking the link 635 with the client pointer or cursor action a new output screen 660 opens with a matrix of i by j small preview pages. The size of i by j matrix may be a fixed specified by the user or the system according to system resource constraints. In one embodiment, the window may have navigation links 680 to the previous or next set of small preview pages 660 according to data file page hits.

In one implementation there may be means for navigating in the search results listing 460. There may be links to the previous or next set of the small preview pages 600, there may also be numeric or other links to directly jump into another set of the small preview pages 600 inside the search result listing 460.

In another implementation the present innovation may be used to reduce downtime of complex industrial machines, e.g. paper machines by providing accurate information about recovery actions to the operators in unexpected situations.

The complex machines come with a large set of unstructured documentation containing drawings, manuals, maintenance guides, operating procedures, part lists, audit material, etc. The documentation is typically dispread in several hundreds data files. In addition a document may contain several hundred pages. Thus it may be very time consuming to find information about relevant correction and recovery actions from this volume of unstructured data.

In case of an unexpected situation (e.g. bearings of calandering machine are over heated) the system is arranged to generate automatic search query triggered by an alarm to provide an immediate correction and recovery suggestion to the operators from the documentation available in the data files. The arrangement is for example fitted so that the connector module 275 in the preview engine 230 has means for integrating to the alarm system and generating a search query for the search engine 220 when an alarm has occurred.

The conventional search engine 220 may be used to find the relevant data files containing information about correction and recovery actions from the content server 240. The preview engine 230 takes those data files for further processing to provide more accurate results for the operators. The relevant data files are paginated and rendered by the preview engine 230. The content converter 280 separates textual information from the graphical information from the data file pages. The textual information is used to create an index of the data file pages. This index is used to search and select those pages from the data file that are relevant to the alarm. Once the relevant data files and associated pages are identified the user interface manager 270 provides the relevant data file pages for the operators in the client 210 output device for further viewing. The relevant data may be e.g. pages from the maintenance documentation to explain typical reasons for overheating, a page of the bearing spare part list from the parts list data file, change instructions pages for the bearings from the drawings data file, etc. The preview engine 230 is used to provide accurate and timely information for the operators to correct and recover from unexpected situations in order to reduce production downtime. The invention is adapted to be suitably used in all the analog cases where relevant information is essential and there is a need to get that information as soon as possible.

Conclusion

The invention must be understood as a tool and method to improve the user's ability to discover relevant information from large amount of decentrally stored data. The methods and arrangements consistent with the principles of the invention will improve information discovery efficiency with the instant access to the accurate page level data file previews. The invention may be used in the context of existing or new network based data search solutions and services, as well as to discover local data repositories with and within a single or clustered computer system.

The foregoing description of the preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4-5, the order of the acts may be modified in other implementations consistent with the principles of the invention. Further, non-dependent acts may be performed in parallel.

It has been described that data files in the search result list are received from the search engine. In other implementations, however, the data files may be identified in other ways, such as from a directory, category, data repository or another listing of data files. Yet in another implementation the search may be done to local data file repositories located in the client device.

In one implementation the client 210, the search engine 220, the preview engine 230 and the content server 240 may be a single entity accessing local data files in the client 210 using a bus 310 and other possible distributed data files using the network 260. This arrangement is commonly known as local search.

Also, exemplary graphical user interfaces have been described with respect to FIGS. 6A-6C. In other implementations consistent with the principles of the invention, the graphical user interfaces may include more, fewer, or different pieces of information, arranged in different order and visual orientation than what has been defined as exemplary implementation. For instance the m by n matrix mentioned earlier can be smaller or bigger that mentioned 3 by 2 matrix. The characters m and n can be for example any integer numbers between 1 and 20.

It will be apparent to one of ordinary skill in the art that aspects of the invention, as described above, may be implemented in many different forms of software, firmware, and hardware in the implementations illustrated in the figures. Thus, the operation and behavior of the aspects were described without reference to the specific software code—it being understood that one of ordinary skilled in the art would be able to design software and control hardware to implement the aspects based on the description herein.

What is claimed is:

1. A method for handling of information search results comprising:
    entering a search query;
    sending the query to a search engine;
    retrieving a search result having a list of data files each representing a document matching the search query; and
    for each of the data files in the list:
        retrieving the data file;
        paginating the content of the retrieved data file into discrete pages;
        generating preview pages each representing a respective discrete page of the retrieved data file; and
        sending the preview pages to a client device which constructs a data file preview which can simultaneously display multiple preview pages generated from the retrieved data file,
    wherein the constructed data file preview is configured to allow an end user of the client device to:
        select preview pages, which are displayed in the data file preview, in order to view higher resolution versions of those preview pages matching the corresponding discrete pages of the retrieved data file, and
    wherein the preview pages simultaneously displayed by the data file preview are limited to those preview pages matching the search query in accordance with content filtering which is performed on a discrete page level.

2. The method of claim 1, wherein the preview pages are indexed for content filtering, and
    wherein only those preview pages that match the search query according the results of the content filtering are selected to be displayed.

3. The method of claim 2, wherein the used search keywords or phrases are highlighted in the displayed preview pages.

4. The method according to claim 1, wherein at least one or more preview pages of each of data files in the list are shown to the user.

5. The method according to claim 1, wherein the data file content is paginated according to original layout.

6. The method according to claim 1, wherein each preview page is compiled from a layered presentation of HTML content and image content associated with the data file or the preview page is compiled from a vector file.

7. The method according to claim 1, wherein in generating the preview pages at least one or more image files are created from each discrete page of the data file.

8. The method according to claim 1, wherein the preview pages whose content matches the search query are selected for the data file preview, and
    the search query keyword(s) or phrases are highlighted in the matching preview pages.

9. The method according to claim 1, wherein a search result area is reserved to display the preview pages associated to the data file.

10. The method according to claim 1, wherein the preview pages are displayed in an m by n matrix format in the data file preview, and
a user selectable zoom-in to the preview pages is provided inside the matrix format.

11. The method according to claim 1, wherein the preview pages are displayed in the data file preview in connection with the data file information provided by the search engine.

12. The method according to claim 1, wherein an m by n matrix of preview pages are populated essentially immediately when preview data becomes partially available.

13. The method according to claim 1, wherein the preview pages that are not currently displayed in the data file preview are pre-loaded in a memory of a preview engine for later viewing.

14. A system for handling of information search results comprising:
a client device having a user interface for entering a search query;
a preview engine that performs the following:
receives the search query from the client device;
sends the query to a search engine;
retrieves, from the search engine, a search result having a list of data files each representing a document matching the search query; and
for each of the data files in the list:
retrieves the data file;
paginates the content of the retrieved data file into discrete pages;
generates preview pages each representing a respective discrete page of the retrieved data file;
sends the preview pages to a client device which constructs a data file preview which can simultaneously display multiple preview pages generated from the retrieved data file,
wherein the constructed data file preview is configured to allow an end use of the client device to:
select preview pages, which are displayed in the data file preview, in order to view higher resolution versions of those preview pages matching the corresponding discrete pages of the retrieved data file, and
wherein the preview pages simultaneously displayed by the data file preview are limited to those preview pages matching the search query in accordance with content filtering which is performed on a discrete page level.

15. The system of claim 14, wherein the preview engine has at least a user interface manager, connectors, a content converter, a page indexer, a highlighter and a cache manager.

16. The system of claim 15, wherein the connectors are equipped to connect the preview engine to the search engine and to content servers, and the connectors are configured to send the search query to the search engine, receive the search result list from the search engine, and download the data files in the list from the content servers to the preview engine.

17. The system of claim 16, wherein in connection with the preview engine the content converter is configured to paginate the content of the retrieved data file and generate the page previews;
wherein the page indexer is configured to index the preview pages for filtering purposes, and search for and select the matching preview pages from each data file;
wherein the highlighter module is arranged to highlight the search query text in the preview pages;
wherein the cache manager is configured to store the page previews into a storage and crawling the data files page previews in the storage according to the specified rules.

18. The system of claim 17, further comprising:
a display for displaying the list of search results provided by the search engine,
wherein the preview engine is configured to:
reserve a search result area to display preview pages associated to the data file;
generate the preview pages in an m by n matrix format; and
provide a user selectable zoom-in to the preview pages inside the matrix format.

19. The system according to claim 14,
wherein preview pages are displayed in the data file preview in connection with the data file information provided by the search engine,
wherein the data file preview has a display area to present page previews in m by n matrix.

20. The system according to claim 14, wherein the data file preview comprises a button, link or area adapted to be clicked by a user for additional preview pages.

21. The system according to claim 14, wherein the preview engine is configured to provide the user an additional matrix of preview pages in a new output screen in case there are more than m by n search result pages associated with the data file and the user requests an additional preview page.

22. The system of claim 21, wherein the output screen created by the preview engine comprises navigation buttons, links or areas adapted for a user to navigate backward and forward through preview pages stored in the memory, and
wherein the preview engine is configured to include one or more buttons adapted to be used to navigate between a search result list provided by the preview engine.

23. The system of claim 22 wherein the preview pages in the matrix in new output screen are user selectable for zoom-in.

24. The system according to claim 14, wherein the preview engine includes a memory into which preview pages that are not currently displayed are pre-loaded for later viewing.

25. The system according to claim 14, wherein the preview engine is configured to populate an m by n matrix of the preview pages essentially immediately when preview data becomes partially available.

* * * * *